United States Patent
Kumagai et al.

(10) Patent No.: US 7,035,901 B1
(45) Date of Patent: Apr. 25, 2006

(54) SMTP SERVER, POP SERVER, MAIL SERVER, MAIL PROCESSING SYSTEM AND WEB SERVER

(75) Inventors: Masatoshi Kumagai, Tokyo (JP);
Toshihiro Watanabe, Tokyo (JP);
Kenichiro Osada, Tokyo (JP);
Nobuhiro Miyatake, Tokyo (JP)

(73) Assignee: Global Media Online, Inc., Tokyo (JP)

( * ) Notice: Subject to any disclaimer, the term of this patent is extended or adjusted under 35 U.S.C. 154(b) by 398 days.

(21) Appl. No.: 09/466,813

(22) Filed: Dec. 20, 1999

(30) Foreign Application Priority Data

Dec. 6, 1999 (JP) ................................. 11-346977

(51) Int. Cl.
*G06F 15/16* (2006.01)

(52) U.S. Cl. ........................................ 709/206; 705/14

(58) Field of Classification Search ................ 709/206, 709/207, 217, 218, 223, 224; 705/14, 26, 705/27
See application file for complete search history.

(56) References Cited

U.S. PATENT DOCUMENTS

| | | | | |
|---|---|---|---|---|
| 6,014,502 A | * | 1/2000 | Moraes ........................ | 709/219 |
| 6,047,310 A | * | 4/2000 | Kamakura et al. .......... | 709/201 |
| 6,055,510 A | * | 4/2000 | Henrick et al. ............... | 705/1 |
| 6,073,165 A | * | 6/2000 | Narasimhan et al. ........ | 709/206 |
| 6,128,646 A | * | 10/2000 | Miloslavsky .................. | 358/402 |
| 6,148,332 A | * | 11/2000 | Brewer et al. ............ | 379/93.24 |
| 6,199,106 B1 | * | 3/2001 | Shaw et al. .................. | 709/203 |
| 6,360,221 B1 | * | 3/2002 | Gough et al. .................. | 705/14 |
| 6,449,657 B1 | * | 9/2002 | Stanbach et al. ............ | 709/245 |
| 6,539,375 B1 | * | 3/2003 | Kawasaki ....................... | 707/5 |
| 6,567,786 B1 | * | 5/2003 | Bibelnieks et al. ............ | 705/14 |
| 6,594,638 B1 | * | 7/2003 | Feldman et al. ............... | 705/14 |
| 6,622,174 B1 | * | 9/2003 | Ukita et al. ................... | 709/246 |
| 6,779,178 B1 | * | 8/2004 | Lloyd et al. ................. | 717/174 |

\* cited by examiner

*Primary Examiner*—Andrew Caldwell
*Assistant Examiner*—Douglas Blair
(74) *Attorney, Agent, or Firm*—Pillsbury Winthrop Shaw Pittman LLP

(57) ABSTRACT

According to the present invention, an SMTP server sending a mail having a predetermined mail address as a recipient to a server that receives and manages the mail having the predetermined mail address, includes: an advertisement information memory operable to store advertisement information to be added to the mail; an advertisement information detector operable to detect the advertisement information to be added to the mail from the advertisement information memory based on at least one of user information about a user having the mail address of the recipient of the mail, user information about a user having a mail address of a sender of the mail and a sentence included in the mail; an advertisement information adding portion operable to add the advertisement information to the mail; and a sending portion operable to send the mail to the server.

22 Claims, 9 Drawing Sheets

THERE IS A NOTICE OF APPLICATION FOR A PRESENT FROM RYOKO ~110
AT THE END OF THIS MAIL.
--- [PR] ----------------------------------------- 112a ⎫
[FREE] YOU CAN GET YOUR OWN DOMAIN NAME "COMPANY-NAME. co. jp"  ⎬ 112
FROM THIS REGISTRATION SITE! FIRSTCOME ORDER!NOW CLICK THIS
http://dt.clickmail.ne.jp/?C,435  112b
        112c           112d
--- [PR] -----------------------------------------
[NEW RELEASED CAR] NEXT GENERATION ELECTRIC CAR "DREAM" IS ⎫ 112
ON SALE FROM TOYO-SAN. PLEASE RESERVE IT FROM THIS SITE. ⎬
http://dt.clickmail.ne.jp/?C,347
--- [PR] -----------------------------------------
[NEW RELEASED GAME SOFTWARE] "DOOR OF DRAGON", NEW GENERATION ⎫ 112
RPG GAME SOFTWARE, NOW YOU CAN RESERVE THIS GAME SOFTWARE! ⎬
ONLY 100 PEOPLE CAN GET A GUIDE BOOK.
http://dt.clickmail.ne.jp/?C,347                         [PR] ---
HI, RIKO
I HAVE NOT SEEN YOU LONG TIME. ARE YOU BUSY?

I WENT TO THE CONCERT OF ****TODAY.
****WAS VERY NICE.
I TOOK A SEAT NEAR THE STAGE BECAUSE I GOT UP TOO EARLY
AND WAS IN LINE EARLY MORNING.                              114
SO, I AM VERY HAPPY TODAY. (^_-)
I BOUGHT A POSTER FOR YOU . I WILL HAND IT TO YOU
WHEN WE MEET NEXT TIME.

CAN YOU GO TO DINNER AFTER FINISHING WORK NEXT WEEK?
I WOULD LIKE TO HAND THE POSTER I BOUGHT THAT TIME.
I FOUND A GOOD ODEN-RESTAURANT IN SHIBUYA. PLEASE LET
ME KNOW YOUR AVAILABLE DAY.

RYOKO
-------------------------------------------------
YOU HAVE A CHANGE TO GET GORGEOUS GIFTS EVERY MONTH!
THIS MONTH'S ITEMS INCLUDE iMAC AND OTHER ITEMS.            116
PLEASE APPLY FOR THE ITEMS FROM THIS PAGE
http://dt.clickmail.ne.jp/?C,565  116a
       116b           116c

[NOTICE] ONLY yoko@interq.ad.jp CAN APPLY.
-------------------------------------------------

*FIG. 3*

SMTP SERVER, POP SERVER, MAIL SERVER, MAIL PROCESSING SYSTEM AND WEB SERVER

BACKGROUND OF THE INVENTION

1. Field of the Invention

The present invention relates to an SMTP server, a POP server, a mail server, a mail processing system and a web server that adds additional information to a piece of mail that is transmitted via a network.

2. Description of the Related Art

Mails (e-mails) have been conventionally exchanged via Internet. The Internet system that enables the exchange of mails includes a plurality of terminals, existing SMTP servers and existing POP servers that are connected through the Internet. In this system, when a user creates a mail specifying a predetermined mail address as a recipient using a terminal, and instructs the terminal to send the created mail, the terminal sends the created mail to a predetermined one of the existing SMTP servers in accordance with SMTP (simple mail transfer protocol). The existing SMTP server receives the mail sent from the terminal and transmits it to another existing SMTP server having a server address included in the recipient's mail address of the mail. The existing SMTP server that finally receives the mail stores the received mail in a predetermined memory thereof.

In a case where the user instructs the terminal to display the mail arrived at his/her mail address, the terminal requests a predetermined one of the existing POP servers in accordance with POP (post office protocol), to transmit the mails. The existing POP server that received the mail transmission request retrieves from a predetermined memory the mail specifying the mail address from which transmission was requested as the recipient, and sends the retrieved mail to the terminal. The terminal receiving the mail then displays the received mail.

In recent years, advertisements have been transmitted using mails. For example, it is known that an advertiser, an advertisement agent or the like creates mails, each including the advertisement, and sends the created mails to predetermined mail addresses. Also, Japanese Patent Laid-Open Publication No. 10-320314 describes an e-mail advertisement insertion apparatus that inserts an advertisement into an e-mail.

SUMMARY OF THE INVENTION

The conventional techniques for sending an advertisement using the mails, has the problem where it cannot be determined which advertisement drew the attention of the user who received and read the advertisement. Moreover, in the case where the advertisement is added to the mail and is sent, it is likely to make a recipient of such a mail uncomfortable.

In addition, the advertiser who places the advertisement desires that the advertisement is more effective. Thus, in the case where various advertisements are added to the mails, for example, it is necessary to establish an environment where the advertiser can send the advertisements to as many users as possible.

Therefore, it is an object of the present invention to provide an SMTP server, a POP server, a mail server, a mail processing system and a web server which overcomes the above issues in the related art. This object is achieved by combinations described in the independent claims. The dependent claims define further advantageous and exemplary combinations of the present invention.

According to the first aspect of the present invention, an SMTP server sending a mail having a predetermined mail address as a recipient, to a server that receives and manages the mail having the predetermined mail address is provided. The SMTP server includes: an advertisement information memory operable to store advertisement information to be added to the mail; an advertisement information detector operable to detect the advertisement information to be added to the mail from the advertisement information memory, based on at least one of user information about a user having the mail address of the recipient of the mail, user information about a user having a mail address of a sender of the mail and a sentence included in the mail; an advertisement information adding portion operable to add the advertisement information to the mail; and a sending portion operable to send the mail to the server.

In an embodiment of the present invention, the advertisement information includes page-specifying information that specifies a predetermined homepage.

In another embodiment of the present invention, the user information includes attribute information that indicates an attribute of the user; a user information memory is further provided to be operable to store a plurality of mail addresses and a plurality of pieces of attribute information about users for the plurality of mail addresses, so as to be associated with each other, respectively, and the advertisement information memory stores the advertisement information and attribute information about a user who is an object for which addition of said advertisement information is performed, so as to be associated with each other; and the advertisement information detector detects the attribute information associated with the mail address of the recipient of the mail from the user information memory, and detects the advertisement information associated with said detected attributed information from the advertisement memory.

In still another embodiment of the present invention, the attribute information is at least one of age, gender and a zip code.

In still another embodiment of the present invention, the SMTP server further includes: an addition refusal information memory operable to store addition refusal information specifying a mail address that refuses the addition of the advertisement; and an addition controller operable to stop the addition of the advertisement information by the advertisement information adding portion to the mail, in a case where the mail address specified by the addition refusal information is the mail address of the recipient of the mail.

In still another embodiment of the present invention, the SMTP server further includes a target key word memory, operable to store the advertisement information and a key word to be included in a sentence of a mail to which said advertisement information is added so as to be associated with each other; and the advertisement information detector detects advertisement information that is associated with a key word corresponding to a phrase included in a sentence of the mail to be sent.

In still another embodiment of the present invention, the SMTP server further includes a non-target key word memory, operable to the advertisement information and a key word to be included in a sentence of a mail to which said advertisement information is not added so as to be associated with each other; and the advertisement information detector removes the advertisement information associated with a key word corresponding to the phrase included in the sentence of the mail to be sent from an object of detection.

Instill another embodiment of the present invention, the mail has a plurality of mail addresses of recipients; the sending portion sends the mail to each of the mail addresses of the recipients when the mail has the plurality of mail addresses of the recipients;

the advertisement information detector detects the advertisement information to be added to the mail that is to be sent to each of the mail addresses, based on the attribute information of the user corresponding to each of the mail addresses; and the advertisement information adding portion adds the advertisement information to the mail that is sent to each of the mail addresses of the recipients.

Instill another embodiment of the present invention, the SMTP server further includes: a point information memory, operable to store a mail address and point information for a user having said mail address to be associated with each other; and a point updating portion operable to update the point information associated with the mail address of the sender of the mail, when the advertisement information adding portion adds the advertisement information to the mail.

According to the second aspect of the present invention, a POP server for storing a mail having a predetermined mail address as a recipient and for sending to a terminal a mail having the predetermined mail address as the recipient, based on a sending request from the terminal to send the mail having the predetermined mail address to the terminal, is provided. The POP server includes: a mail memory operable to store a mail having the predetermined mail address as the recipient;

an advertisement information memory operable to store at least one piece of advertisement information; an advertisement information detector operable to retrieve at least one piece of advertisement information that is to be added to the mail from the advertisement information memory, based on at least one of user information about a user having a mail address of a sender of the mail, user information about a user having the mail address of the recipient of the mail, and a sentence of the mail; an advertisement information adding portion operable to add the advertisement information detected, to the mail; and a sending portion operable to send a terminal the mail to which the advertisement information is added.

In an embodiment of the present invention, the advertisement information includes page information that specifies a predetermined homepage.

In another embodiment of the present invention, the user information includes attribute information that indicates an attribute of the user; a user information memory is further provided to be operable to store at least one mail address and at least one piece of attribute information of at least one user of said at least one mail address, so as to be associated with each other; and the advertisement information memory stores the advertisement information and attribute information of a user for which the addition of the advertisement information is performed, so as to be associated with each other; the advertisement information detector detects the attribute information associated with the mail address of the mail from the user information memory, and detects the advertisement information associated with the detected attribute information.

In still another embodiment of the present invention, the attribute information indicates at least one of age, gender and a zip code.

In still another embodiment of the present invention, the POP server further includes: an addition refusal information memory operable to store addition refusal information specifying a mail address that refuses the advertisement information; and an addition controller operable to stop the addition of the advertisement information by the advertisement information adding portion to the mail, in a case where the mail address specified by the addition refusal information is the mail address of the terminal.

In still another embodiment of the present invention, the POP server further includes a target key word memory operable to store the advertisement information and a key word to be included in a sentence of a mail to which said advertisement information is added so as to be associated with each other; and the advertisement information detector detects advertisement information associated with the key word corresponding to a phrase included in a sentence of the mail.

In still another embodiment of the present invention, the POP server further includes a non-target key word memory, operable to store the advertisement information and a key word that is to be included in a sentence of a mail to which said advertisement information is not added; and the advertisement information detector removes the advertisement information associated with the key word corresponding to the phrase included in the sentence of the mail, from an object of detection.

In still another embodiment of the present invention, the POP server further includes: a point information memory operable to store a mail address and point information for a user having said mail address so as to be associated with each other; and a point updating portion operable to update the point information associated with the mail address of the recipient of the mail, when the advertisement information adds the advertisement information to the mail.

According to the third aspect of the present invention, a mail server for sending a mail sent from a first information process apparatus to a second information process apparatus is provided. The mail server includes: an additional information memory operable for additional information to be added to the mail; an additional information detector operable to detect the additional information from the additional information memory, based on at least one of attribute information about a user having a mail address of a sender of the mail, attribute information about a user having amail address of a recipient of the mail, and a sentence of the mail; an additional information adding portion operable to add the additional information to the mail sent from the first information process apparatus; and a sending portion operable to send the mail to which the additional information is added, to the second information process apparatus.

According to the fourth aspect of the present invention, a mail processing system is provided. The mail processing system includes: a web server operable to send a predetermined program to a terminal, based on a request from the terminal; and a mail server operable to send a mail having a predetermined mail address as a recipient to a server that receives and stores the mail having the predetermined mail address as the recipient. The mail server includes: an advertisement information memory operable to store advertisement information added to the mail to be sent; an advertisement information detector operable to retrieve the advertisement information from the advertisement information memory that is to be added to the mail; an advertisement information adding portion operable to add the advertisement information to the mail; and a sending portion operable to send the mail to the server. The web server includes: a reception portion operable to receive an adding request of advertisement information to the mail from the terminal; and a setting controller operable to make a setting for allowing the mail to be sent by the mail server, by sending a program to the terminal from which the adding request is received.

In an embodiment of the present invention, the advertisement information adding portion of the mail server adds to the mail advertisement, information including user specifying information that specifies a user of the mail address of the recipient of the mail, and link information that makes the terminal used by the user send the user specifying information to the web server when an instruction by the user occurs; the web server or the mail server includes a point information memory operable to a mail address and point information of a user having said mail address to be associated with each other. The web server further includes: a user specifying information receiving portion operable to receive the user specifying information sent from the terminal by the link information; and a point updating portion operable to update, based on the user specifying information received by the user specifying information receiving portion, the point information of the corresponding user.

In another embodiment of the present invention, the advertisement information adding portion in the mail server adds to the mail advertisement, specifying information that specifies an advertiser of the advertisement information, and link information that makes a terminal used by the user having the mail address of the recipient of the mail send the advertisement specifying information to the web server, when an instruction of said user occurs. The web server or the mail server includes a charging information memory, operable to store information specifying an advertiser and charging information about charging said advertiser. The web server further includes: an advertisement specifying information receiving portion operable to receive the advertisement specifying information sent from the terminal by the link information; and a charging information updating portion operable to update, based on the advertisement specifying information received by the advertisement specifying information receiving portion, the charging information of a corresponding advertiser.

In another embodiment of the present invention, the web server or the mail server includes a charging information memory, operable to store advertisement specifying information that specifies an advertiser, charging information about charging on said advertiser, and address information of an advertisement homepage to be presented to a user of a terminal, so as to be associated with one another. The advertisement information adding portion adds to the mail advertisement, specifying information that specifies an advertiser of the advertisement information, and link information that makes the terminal send the advertisement specifying information to the web server, in a case where the instruction of the user of the terminal occurs. The web server includes: an advertisement specifying information receiving portion operable to receive the advertisement specifying information sent from the terminal by the link information; an instruction information memory controller operable to control the terminal that sent the advertisement specifying information to store instruction information indicating that an instruction by the user occurred; and a homepage retrieval controller operable to detect, based on the advertisement specifying information received by the advertisement specifying information receiving portion, the address information of the advertisement homepage associated with the advertisement specifying information, and to control the terminal to retrieve the advertisement homepage having said address information.

In still another embodiment of the present invention, the mail processing system further includes: a confirmation receiving portion operable to receive confirmation that the instruction information is stored in a terminal that requested a predetermined target homepage that is linked to the advertisement homepage; and a goal achievement charging updating portion operable to update, based on receipt of the confirmation, the charging information associated with an advertisement specifying information of an advertiser of the target homepage indicated by the confirmation.

According to the fifth embodiment of the present invention, a web server for sending a predetermined program to a terminal based on a request from the terminal is provided. The web server includes: a reception portion operable to receive a request to add advertisement information to a mail from the terminal; and a setting controller operable to send a program to the terminal from which the adding request came, so that setting for enabling a mail server that adds the advertisement information to the mail to send a mail to a mail address of a recipient, is performed.

BRIEF DESCRIPTION OF THE DRAWINGS

FIG. 3 shows an example of an e-mail to which advertisements are added, according to the first embodiment of the present invention.

DETAILED DESCRIPTION OF THE INVENTION

The invention will now be described based on preferred embodiments, which do not intend to limit the scope of the present invention, but rather to exemplify the invention. All of the features and the combinations thereof described in the embodiments not necessarily essential to the invention.

Figure 1:
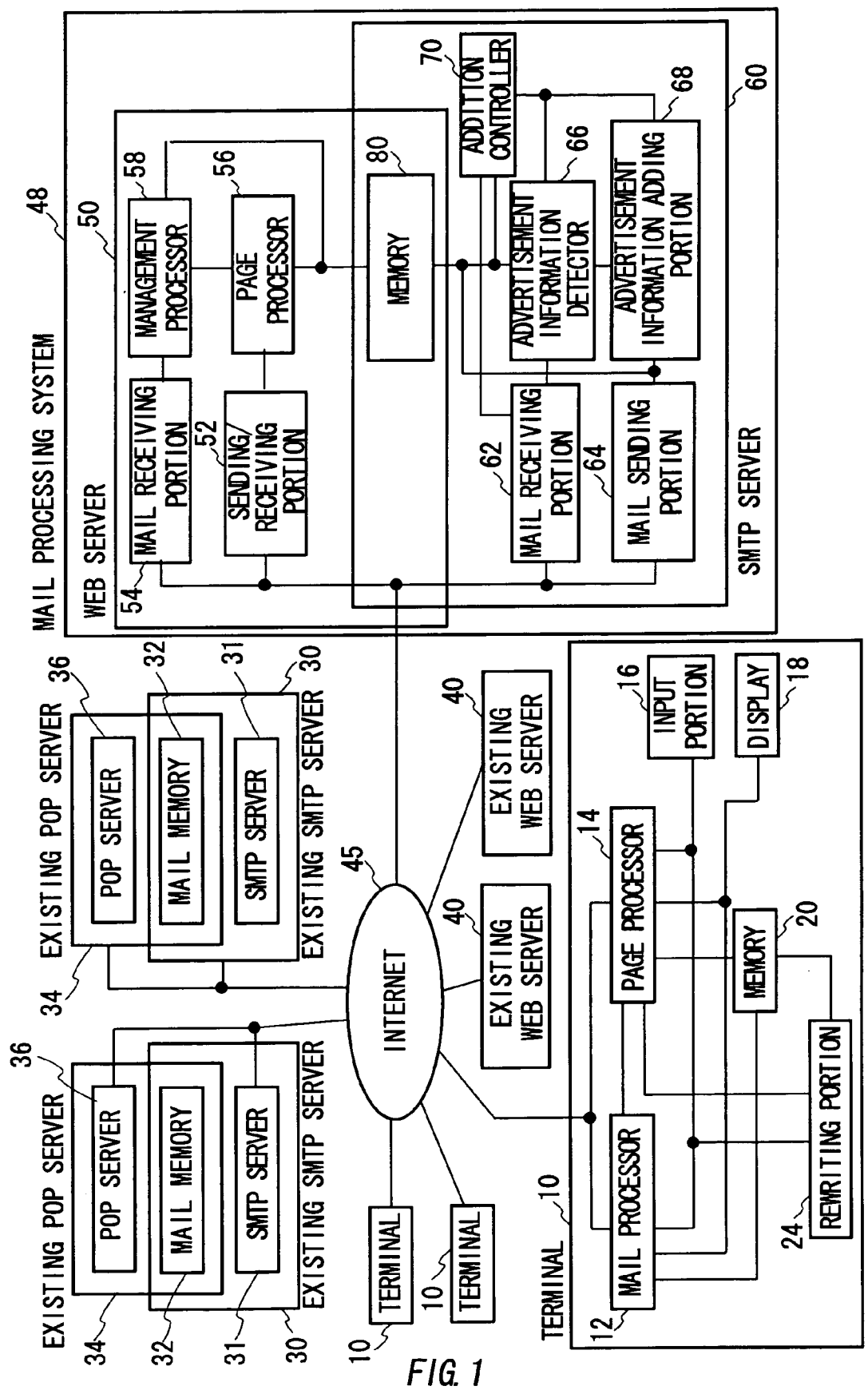
FIG. 1 is a block diagram showing an Internet system including a mail processing system, according to the first embodiment of the present invention.

FIG. 1 is a block diagram showing an Internet system including a mail processing system, according to the first embodiment of the present invention. The Internet system includes a plurality of terminals 10, a plurality of existing SMTP servers 30, a plurality of existing POP servers 34, a plurality of existing web servers 40 and a mail processing system 48 that includes a web server 50 and an SMTP server 60. It should be noted that an information process apparatus defined in the appended claims corresponds to the terminals 10, the existing SMTP servers 30 and the existing POP servers 34.

The existing SMTP server 30 includes an SMTP processor 31 and a mail memory 32. The mail memory 32 stores at least one mail, each having a predetermined mail address as a recipient. The mail memory 32 is also used by the existing POP server 34. The SMTP processor 31 sends a mail sent from the terminal 10, to one of the existing SMTP servers 30 corresponding to the server address included in the recipient's mail address of the mail, in accordance with SMTP (simple mail transfer protocol).

The existing POP server 34 includes a POP processor 36 and the mail memory 32. The POP processor 36 retrieves from the mail memory 32 the mail specifying as the recipient the mail address from which the transmission was requested by the terminal 10, and sends the retrieved mail to said terminal 10. The existing web server 40 sends to the terminal 10 a homepage that was requested to be sent, when the transmission request for said homepage came from said terminal 10. In addition, the existing web server 40 performs a program, for example, CGI (common gateway interface) which is associated with the homepage.

The terminal 10 includes a mail processor 12, a page processor 14, an input portion 16, a display 18, a memory 20 and a rewriting portion 24. The rewriting portion 24 is constructed by installation of a predetermined program, described later. In the present embodiment, the page processor 14, the input portion 16 and the display 18 are constituted mainly by a browser, while the mail processor 12 is constituted by mail software.

The input portion 16 includes an input device such as a mouse, keyboard or the like, and receives input by the user via the input device. The display 18 includes a display device, for example, and displays various pieces of information.

The memory 20 stores edited mails or received mails. For each mail address of the user of the terminal 10, the memory 20 stores address information of a server that is used for sending a mail, by using said mail address as the sender and address information of a server that isused for receiving a mail specifying said mail address as the recipient. Before the rewriting portion 24 in the present embodiment is formed, the memory 20 stores, for each mail address, address information of one of the existing SMTP servers 30 as the address information of the server used for sending the mail including said mail address as the sender, and address information of one of the existing POP servers 34 as the address information of the server used for receiving the mail specifying said mail address as the recipient. In addition, the memory 20 stores a file of information that the existing web server 40 or the web server 50 instructs the memory 20 to store, i.e., a Cookie file.

The mail processor 12 creates or edits the mail based on a user's instruction input from the input portion 16 while making the display 18 display the mail, and then stores the edited mail in the memory 20. The mail processor 12 sends and receives a mail. More specifically, in the case of sending the mail, based on the address information of the server used for sending the mail, stored in the memory 20, the mail processor 12 sends a mail to be sent to said server. In the case of receiving the mail, based on the address information of the server used for receiving the mail, stored in the memory 20, the mail processor 12 sends to said server a sending request of the mail specifying a predetermined mail address as the recipient and receives the mail sent from said server.

The page processor 14 sends to the corresponding server the transmission request of the homepage that was requested through the input portion 16, and then receives from said server the homepage corresponding to the transmission request. The page processor 14 instructs the display 18 to display the contents of said homepage or conducts programs, based on the received homepage.

The rewriting portion 24 is formed at the time when the predetermined program has been installed. Immediately after the rewriting portion 24 is formed, the rewriting portion 24 sets in the memory 20, address information of the SMTP server 60 as the server used for sending the mail. In the present embodiment, in the case where the memory 20 stores address information of the server used for sending the mail, for each of a plurality of mail addresses, the rewriting portion 24 sets the address information of the SMTP server 60 as the address information of each server. Thus, it is unnecessary for the user himself/herself to change the address information of the server used for sending the mail. In addition, in accordance with the user's instruction input from the input portion 16, the rewriting portion 24 selects either one of the address information of the SMTP server 60 and the address information of the existing SMTP server 30 that had been set before the SMTP server 60 was set, and sets the selected address information as the address information of the server used for sending the mail. In the present embodiment, buttons for changing the set address information are displayed on the display 18, and then the user's instruction to select one button is received via the input portion 16.

The SMTP server 60 as one example of a mail server includes a mail receiving portion 62, a mail sending portion 64 that is one example of a sending portion, an advertisement information detector 66 as one example of an additional information detector, an advertisement adding portion 68 as one example of a point updating portion and an additional information adding portion, an addition controller 70 and a memory 80. In the present embodiment, the memory 80 is also used by the web server 50. Please note that an advertisement information memory, a user information memory, an addition refusal information memory, a target key word memory, a non-target key word memory, a point information memory, an advertisement information memory, an additional information memory and a charging information memory recited in the appended claims are implemented by the memory 80 in the present embodiment.

The memory 80 stores information related to the user (user information), information related to the advertiser (advertiser information), at least one homepage, and at least one program. The homepage and the program are used by the web server 50. As an example of the homepage, there is a registration page by which the user registers the user information in order to start addition of the advertisement information to mails, or a setting page that enables the setting of the user information.

Figure 2:
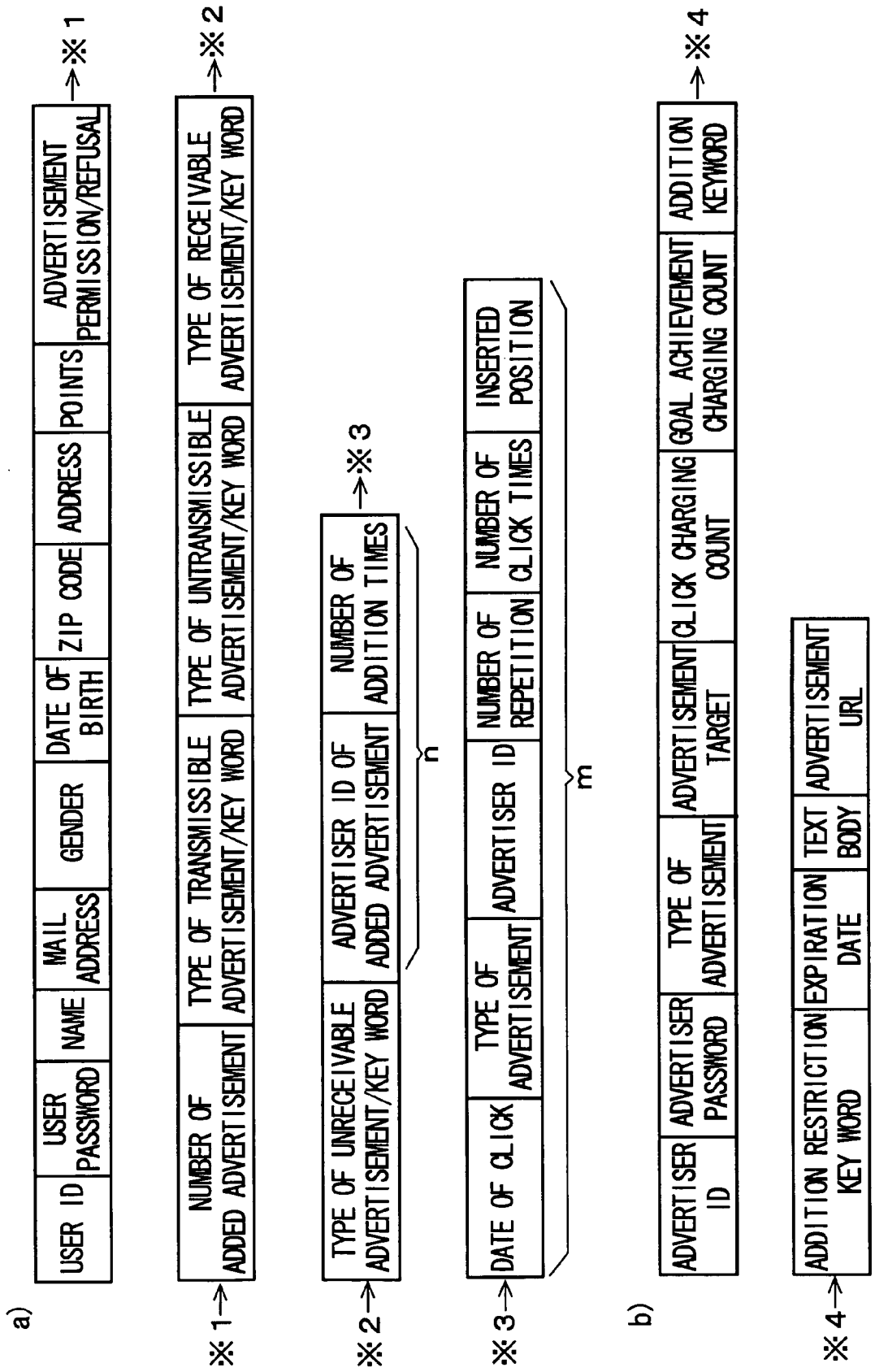
FIGS. 2A and 2B are diagrams showing a structure of data in a memory, according to the first embodiment of the present invention.

FIGS. 2A and 2B are diagrams explaining a structure of data stored in the memory of the mail processing system according to the first embodiment of the present invention. FIG. 2A shows the data structure of the user information, while FIG. 2B shows the data structure of the advertiser information.

The user information includes a user ID field, a user password field, a name field, a mail address field, a gender field, a date of birth field, a zip code field, an address field, a points field, an advertisement permission/refusal field, a number of added advertisements field, a type of transmissible advertisement/key word field, a type of untransmissible advertisement/key word field, a type of receivable advertisement/key word field, a type of unreceivable advertisement/key word field, an advertiser ID of added advertisement field, a number of addition times field, a date of click field, a type of advertisement field, an advertiser ID field, a number of repetition field, a number of click times field and an inserted position field.

The user ID field stores identification information of the user (user ID). The user password field stores a password of the user. The name field stores the name of the user. The mail address field stores the mail address of the user. The gender field stores the gender of the user as an example of attribute information of the user. The date of birth field stores the date of birth of the user as another example of the attribute information of the user. Alternatively, the date of birth field may store the age of the user as an example of the attribute information of the user, instead of the date of birth. The zip code field stores the zip code as still another example of the attribute information of the user. The address field stores the address of the user as still another example of the attribute information of the user. The points field stores the user's point(s). The point(s) is/are given to a person who contributes to using the advertisement. The user can exchange the points for his/her desired item depending on the number of the points.

The advertisement permission/refusal field stores addition refusal information indicating that the user refuses the addition of the advertisement, when the user refuses the addition of the advertisement. The number of added advertisements field stores the number of pieces of advertisement information that are added to the mail. Although this number is set to "1" as a default number in the present embodiment, it can be set to any of "1" to "3" by the user. The type of transmissible advertisement/key word field stores the type of the advertisement and the advertisement keywords that define the advertisement information the user wishes to add to the mail to be sent.

The type of untransmissible advertisement/key word field stores the type of advertisement and the advertisement key words that define the advertisement information the user does not wish to add to the mail to be sent. The type of receivable advertisement/key word field stores the type of advertisement and the advertisement key words that define the advertisement information the user wishes to add to the mail to be received. The type of unreceivable advertisement/key word field stores the type of advertisement and the advertisement key words that define the advertisement information the user does not wish to add to the mail to be received.

A pair made up of the advertiser ID of added advertisement field and the number of addition times field, exists for every advertisement information added to the mails. In the present embodiment, there are a plurality of pairs (n pairs). The advertiser ID of added advertisement field, stores the advertiser ID of the advertisement information that was added to the mail to be sent to the user. The number of addition times field, stores the number of times of addition of the advertisement information to the mail to be sent to the user.

A group of the date of click field, the type of advertisement field, the advertiser ID field, the number of repetition field, the number of click times field and the inserted position field collectively stores the contents related to a single piece of advertisement information that was distributed to the users. In the present embodiment, there are a plurality of groups (m groups). The date of click field stores the date at which the user clicked link information in the advertisement information added to the mail. The type of advertisement field stores a type of the advertisement for which the user clicked the link information. The advertiser ID field stores the advertiser ID of the advertiser of the advertisement information for which the user clicked the link information. The number of repetition field stores the number of times of transmission of the advertisement information to the user. The number of click times field stores the times of clicks by the user for the advertisement information. The inserted position field stores a position in the mail where the advertisement information is added.

The advertiser information shown in FIG. 2B includes the advertiser ID field, an advertiser password field, the type of advertisement field, an advertisement target field, a click charging count field, a goal achievement charging count field, an addition key word field, an addition restriction key word field, an expiration date field, a text body field and an advertisement URL field.

The advertiser ID field stores identification information of the advertiser (advertiser ID). The advertiser password field stores the password of the advertiser. The type of advertisement field stores the type of advertisement information. The advertisement target field stores the attribute information of the user who is a target of the addition of the advertisement information. The click charging count field stores charging information in the case where charging is performed by the click by the user. The goal achievement charging count field stores charging information in the case where the charging is performed when the goal is achieved.

The addition key word field stores at least one key word that has to be included in the body of the mail, when the advertisement information is added. The addition restriction key word field stores at least one key word that should not be included in the body of the mail, when the advertisement information is added. The expiration date field stores an expiration date of the advertisement information. The text body field stores a text body as an example of the advertisement information added to the mail. The advertisement URL field stores address information of a homepage that contains detailed information of the advertisement, as another example of the advertisement information, such as URL (uniform resource locator).

Referring back to FIG. 1, the mail receiving portion 62 receives the mail sent from the terminal 10. The mail sending portion 64 receives the mail including a mail address to which the mail is to be sent as the recipient, and sends it to the existing SMTP server 30 that is stored. In the present embodiment, the mail sending portion 64 sends the mail to the existing SMTP server 31 having the server address included in the recipient's mail address of the mail. The advertisement information detector 66 detects attribute information that is made to be associated with the recipient's or the sender's mail address of the mail received by the mail receiving portion 64, from the user information in the memory 80. The advertisement information detector 66 also detects the advertisement information, for which the attribute information corresponding to the detected attribute information is set as the target of the advertisement, from the advertiser information in the memory 80.

In addition, the advertisement information detector 66 detects the type of transmissible advertisement and key word made to be associated with the sender's mail address of the mail, or the type of receivable advertisement and key word made to be associated with the recipient's mail address, from the user information in the memory 80. Also, the advertisement information detector 66 detects from the advertiser information in the memory 80, advertisement information that includes at least one phrase corresponding to the type of transmissible advertisement and key word or the type of receivable advertisement and key words that have been detected.

In the present embodiment, in the case where the user information includes information that is made to be associated with the recipient's mail address of the mail, for example, the type of receivable advertisement and key word, the advertisement information detector 66 detects the advertisement information based on said information included in the user information. Otherwise, the advertisement information detector 66 detects the advertisement information based on information that is made to be associated with the sender's mail address, the type of transmissible advertisement and key word, for example. In the case where there is no information associated with either one of the recipient's mail address or the sender's mail address, the advertisement information detector 66 does not detect the advertisement information based on such information.

The advertisement information detector 66 detects advertisement information for which a key word corresponding to the phrase included in a sentence of the mail is stored in the addition key word field of the advertiser information, but removes the advertisement information for which the key word corresponding to the phrase included in the sentence of the mail is made associated with the addition key word field of the advertiser information, from the detection target. In the case where the mail specifies a plurality of recipient's mail addresses, the advertisement information detector 66 detects the advertisement information to be added to the mail that is to be sent to each recipient's mail address based on the user information of the user corresponding to each recipient.

The advertisement information detector 66 detects whether or not the advertiser ID of the detected advertisement information has already been registered in the advertiser ID of added advertisement field of the user information. In the case where the advertiser ID has been registered, the corresponding time of addition field is increased by one. Otherwise, the advertiser ID is added to the advertiser ID of added advertisement field and the corresponding time of addition field is set to "1".

The advertisement information addition portion 68 adds the advertisement information detected by the advertisement information detector 66 to the mail received by the mail receiving portion 62. In the case where the mail specifies mail addresses as a plurality of recipients, the advertisement information addition portion 68 creates the mails to be sent to the recipients, respectively, and performs addition of the advertisement information to each mail, the added advertisement information being detected for each mail to be added by the advertisement information detector 66. Also, the advertisement information addition portion 68 adds to the mail, user specifying information that specifies the user having the mail address of the recipient of said mail, such as the user ID; advertiser specifying information that specifies the advertiser, such as the advertiser ID; and the link information that makes the terminal 10 send the user specifying information and the advertiser specifying information to the web server 50, when the user of the terminal 10 instructs the terminal 10 to do so.

In addition, the advertisement information addition portion 68 adds a notice of application for a gift, such as "there is a notice of application for gift from XX at the end of this mail", the contents notifying that the recipient of said mail can apply for the gift, and application information for application of the gift to the mail, in the present embodiment. As the application information, the user specifying information that specifies the user having the mail address of the recipient of said mail, such as the user ID, and application-link information that makes said user specifying information be sent to the web server 50 in the present embodiment. In the above example, "XX" in the notice of the application for the gift indicates the name of the sender of the mail. Alternatively, a field storing a phrase such as a nickname may be provided in the user information in order to display the phrase stored this field in "XX". The advertisement information addition portion 68 updates the point(s) in the points field that is made to be associated with the sender's mail address of said mail, in the case where the advertisement information is added to the mail.

FIG. 3 shows an example of a mail to which the advertisement information is added according to the first embodiment of the present invention. As shown in FIG. 3, the mail with the advertisement information added thereto includes a mail-body 114 created by the sender, the notice 110 inserted at the top of the mail, the advertisement information 112 inserted after the notice 110, and the gift-application information 116 inserted after the mail-body 114. The advertisement information 112 includes a text part 112*a* describing the advertisement, and link information 112*b* that is constituted by a URL 112*c* to the web server 50 and parameters 112*d* to be supplied to said web server 50. The parameters 112*d* include at least the user specifying information and the advertisement specifying information. It should be noted that a URL of a homepage describing the details, can be specified from the advertiser information stored in the memory 80 based on the advertisement specifying information. The gift-application information 116 includes the application-link information 116*a* that is constituted by a URL 116*b* to the web server 50, and parameters 116*c* to be supplied to the web server 50. The parameters 116*c* include at least the user specifying information.

Referring back to FIG. 1, the addition controller 70 detects whether or not the addition refusal information indicating the refusal of the addition of the advertisement is set in the advertisement permission/refusal field in the memory 80 that is associated with the recipient's mail address of the mail received by the mail receiving portion 62. In the case where the addition refusal information is set, this means that the user having the mail address of the recipient of said mail refuses the addition of the advertisement. Thus, the addition controller 70 stops the addition of the advertisement information by the advertisement information addition portion 68.

As shown in FIG. 1, the web server 50 includes a sending/receiving portion 52 as an example of a reception portion, a user specifying information receiving portion, an advertisement information receiving portion and a confirmation receiving portion; a mail sending portion 54; a page processor 56 as an example of a setting controller, a point updating portion, a charging updating portion, an instruction information memory controller, a homepage retrieval controller and a goal achievement charging updating portion; a management processor 58; and the memory 80. The sending/receiving portion 52 sends and receives various types of data to/from the terminal 10. For example, the sending/receiving portion 52 receives a sending request of a page sent from the terminal 10, information input by the terminal 10, or the like, while sending the page requested to be sent, that has been supplied from the page processor 56, to the terminal 10 that conducted the sending request of the page.

Moreover, the sending/receiving portion 52 receives from the terminal 10 an addition request of the advertisement information to the mail. Also, the sending/receiving portion 52 receives the user specifying information and the advertisement specifying information sent from the terminal 10. Furthermore, the sending/receiving portion 52 receives the confirmation notice that instruction information is stored in the terminal 10 that requested a predetermined target homepage linked to an advertisement homepage. In the present embodiment, the sending/receiving portion 52 receives the instruction information as the confirmation notice. The mail sending portion 54 sends the mail created by the management processor 58.

When the sending/receiving portion 52 receives the page-sending request, the page processor 56 retrieves the corresponding page from the memory 80 and supplies the retrieved one to the sending/receiving portion 52. When the sending/receiving portion 52 receives the addition request, the page processor 56 retrieves a registration page to be used for registration, from the memory 80, and sends the retrieved one to the terminal 10 via the sending/receiving portion 52.

The page processor 56 registers the user information input in the registration page into the memory 80, and notifies the management processor 58 that the corresponding user has been registered. Simultaneously, the page processor 56 retrieves a predetermined program from the memory 80 and sends it to the terminal 10 from which the addition request was sent, via the sending/receiving portion 52, thus installing the program in the terminal 10. Moreover, the page processor 56 sets setting information input in the setting page, into the user information stored in the memory 80. The page processor 56 updates, based on the user specifying information received by the sending/receiving portion 52, the point information of the corresponding user. Also, based on the advertisement specifying information received by the sending/receiving portion 52, the page processor 56 updates the charging information of the corresponding advertiser.

In addition, based on the user specifying information and the advertisement specifying information received by the sending/receiving portion 52, the page processor 56 registers various types of information corresponding to the date of click field the type of advertisement field, the advertisement ID field, the times of repetition field, the number of click times field, and the inserted portion field of the user information in the memory 80.

The page processor 56 makes the terminal 10 that sent the advertisement specifying information, store the instruction information indicating that the instruction by the user to the advertisement information has occurred. Also, based on the advertisement specifying information received by the sending/receiving portion 52, the page processor 56 detects address information of the advertisement homepage associated with the advertisement specifying information, and makes the terminal 10 receive the advertisement homepage corresponding to said address information. Furthermore, based on the receipt of the confirmation notice, the page processor 56 updates the charging information associated with the advertisement specifying information of the advertiser of a target homepage that is indicated by the confirmation notice.

When being notified by the page processor 56 that a user has been registered, the management processor 58 creates a mail specifying the mail address of said user as the recipient's mail address, so as to include the user ID and the user password for said users, and outputs the created mail to the mail sending portion 54. Moreover, based on the information stored in the memory 80 every predetermined time period, the management processor 58 creates a mail including the points of the user for each user's mail address, and outputs the created mail to the mail sending portion 54. Furthermore, the management processor 58 creates a report on the attribute information of those who clicked the advertisement information, such as a report on a gender ratio, an age distribution, a residence distribution or the like, based on the information stored in the memory 80, and sets the advertiser of said advertisement information as the recipient of a mail including the created report. The management processor 58 then outputs the thus created mail to the mail sending portion 54.

In addition, the management processor 58 detects advertisement information having a time period from the current date to the expiration date equal to or less than a predetermined length of time period, based on the information stored in the memory 80, and creates a mail notifying the advertiser of the detected advertisement information that the validity of the advertisement information will expire shortly. Then, the mail is output to the mail sending portion 54. Also, the management processor 58 creates a report on the number of the total times of advertisement distribution, the number of click times, or results of tracing in sites per month, week, or day, or the like, based on the information stored in the memory 80. Moreover, the management processor 58 creates reports on the number of insertions of advertisements for each user, the number of advertisements exposed, and the point information based on the user information stored in the memory 80. Furthermore, the management processor 58 creates, for each user, a mail to said user that includes the point(s) of said user at a predetermined time interval, and outputs the created mail to the mail sending portion 54.

Figure 4:
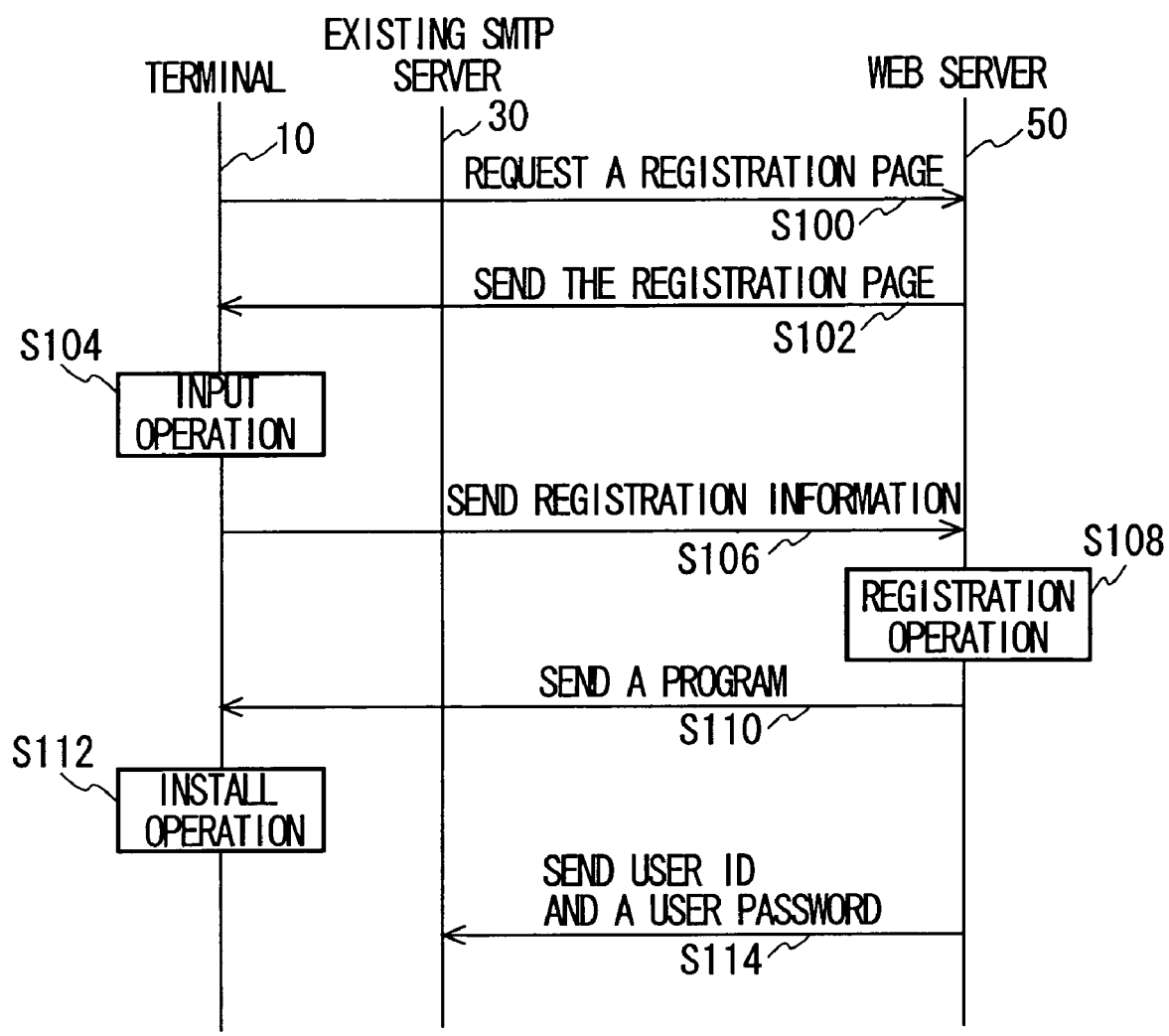
FIG. 4 is a sequence diagram of an initial registration operation for adding the advertisement to the e-mail, according to the first embodiment of the present invention.

FIG. 4 is a sequence diagram of the initial registration operation for starting the addition of the advertisement information to the mail according to the first embodiment of the present invention. When a display request of the registration page in which the registration for starting the addition of the advertisement information is performed by the user is input by the input portion 16 in the terminal 10, the page processor 14 sends the sending request of the registration page to the web server 50 (Step S100). In the web server 50, the sending/receiving portion 52 receives the sending request of the registration page. Then, the page processor 56 retrieves the registration page from the memory 80 and sends the retrieved one to the terminal 10 that sent the request, via the sending/receiving portion 52 and the Internet 45 (Step S102).

In the terminal 10, the page processor 14 makes the display 18 display the registration page. When the user inputs registration information such as the name, the mail address, the gender, the date of birth, the zip code, the address or the like, via the input portion 16, and then inputs a sending request of the registration information (Step S104), the page processor 14 sends the input registration information to the web server 50 (Step S106). In the web server 50, the page processor 56 receives the registration information via the sending/receiving portion 52. Then, the page processor 56 registers various types of information into the user information in the memory 80, based on the received registration information, and notifies the management processor 58 that the registration has been completed (Step S108).

Next, the page processor 56 retrieves a program required for adding the advertisement information in the terminal 10 from the memory 80, and sends the retrieved program to the terminal 10 so that the program can be installed in the terminal 10 (Step S110). Then, the page processor 14 receives the program in the terminal 10 and the installation of said program is conducted (Step S112). In this way, the rewriting portion 24 is formed in the terminal 10. The thus formed rewriting portion 24 sets in the memory 20 the address information of the SMTP server 60 as the server used for sending mails. Therefore, it is unnecessary for the user himself/herself to change the address information of the server used for sending the mails.

Then, the management processor 58 creates a mail to be sent to the registered mail address so as to include the user ID and the user password of the user that has been registered. The mail sending portion 52 sends the thus created mail to the existing SMTP server 30 that stores mails specifying said mail address (Step S114). The user can obtain the user ID and the user password by retrieving the mail from the existing POP server 34 via the terminal 10.

Figure 5:
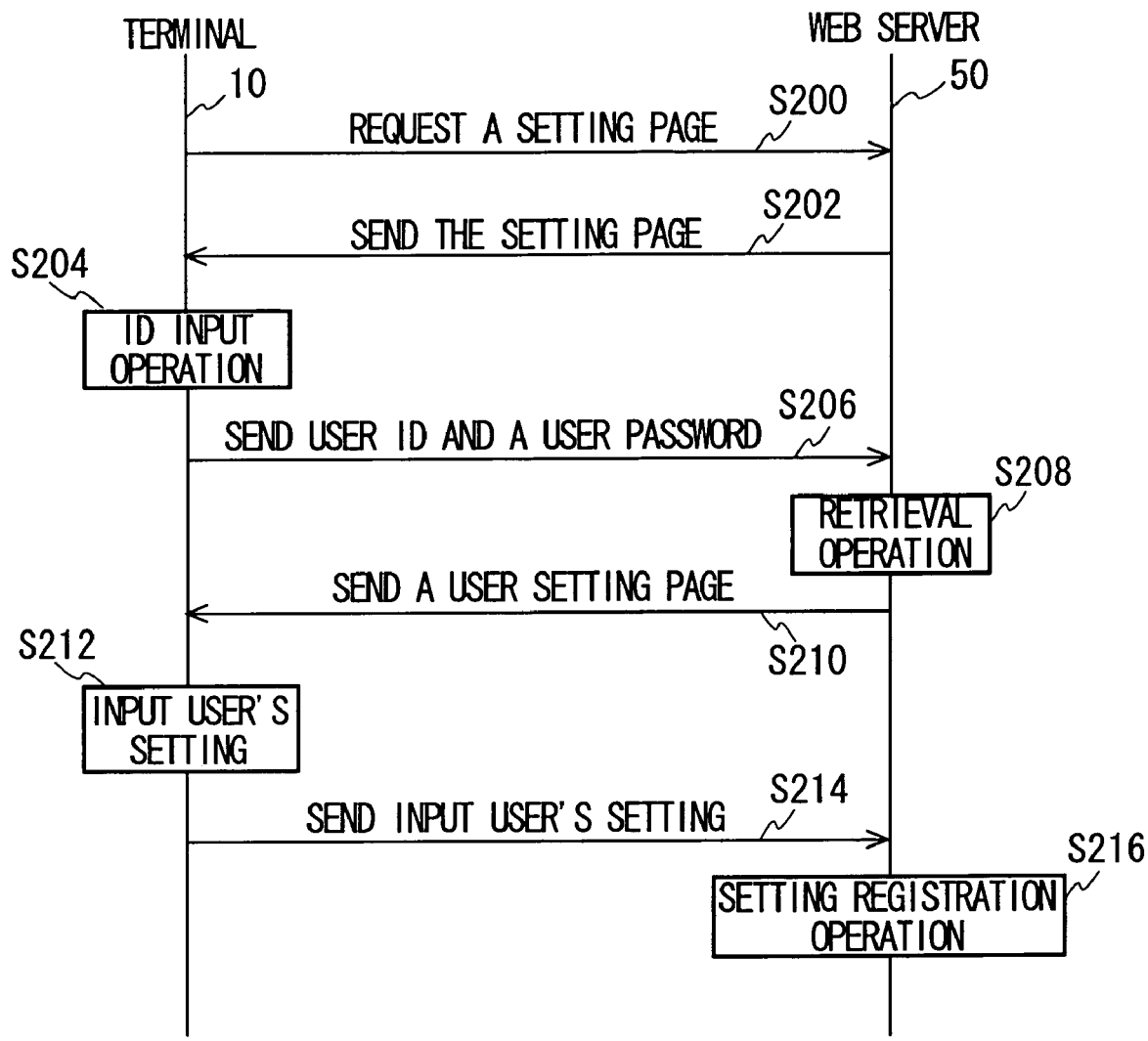
FIG. 5 is a sequence diagram of an operation for changing setting of user information, according to the first embodiment of the present invention.

FIG. 5 is a sequence diagram of an operation for changing the setting of the user information according to the first embodiment of the present invention. When a request to display a setting page is input by the user via the input terminal 16 in the terminal 10, the page processor 14 sends a sending request of the setting page to the web server 50 (Step S200). In the web server 50, the sending/receiving portion 52 receives the sending request of the setting page. Then, the page processor 56 retrieves the setting page from the memory 80 and sends the retrieved setting page to the terminal 10 from which the request came, via the sending/receiving portion 52 and the Internet 45 (Step S202).

In the terminal 10, the page processor 14 makes the display 18 display the setting page. When the user ID and the user password are input by the user from the input portion 16 and a transmission permission is input (Step S204), the page processor 14 sends the web server 50 the user ID and the user password that have been input (Step S206). In the web server 50, the page processor 56 receives the user ID and the user password via the sending/receiving portion 52 and retrieves the corresponding information from the user information in the memory 80 (Step S208), and then sends the user's setting page to the terminal 10 via the sending/receiving portion 52 (Step S210).

In the terminal 10, the page processor 14 makes the display 18 display the user's setting page. When setting information such as the number of advertisements to be added, the type of transmissible advertisement or the type of receivable advertisement is input by the user via the input portion 16 and a sending request of the input setting information is input by the user (Step S212), the page processor 14 sends the input setting information to the web server 50 (Step S214). In the web server 50, the page processor 56 receives the setting information via the sending/receiving information 52 and then sets the information included in the user information in the memory 80, based on the received setting information (Step S216).

Next, a mail sending operation in the terminal 10 in which a program for adding an advertisement has already been installed is described. In this description, it is assumed that the mail in which the mail address of the recipient was set has already been created in the memory 20, and the address information of the SMTP server 60 is set by the rewriting portion 24 in the memory 20 as the server to be used for sending the mails. In the terminal 10, when the user inputs a mail sending instruction via the input portion 16, the mail processor 12 retrieves a corresponding mail from the memory 20 and sends it to the SMTP server 60, the address information of which is stored in the memory 20. In this way, the user can easily send mail to the SMTP server 60 that adds the advertisement information.

Figure 6:
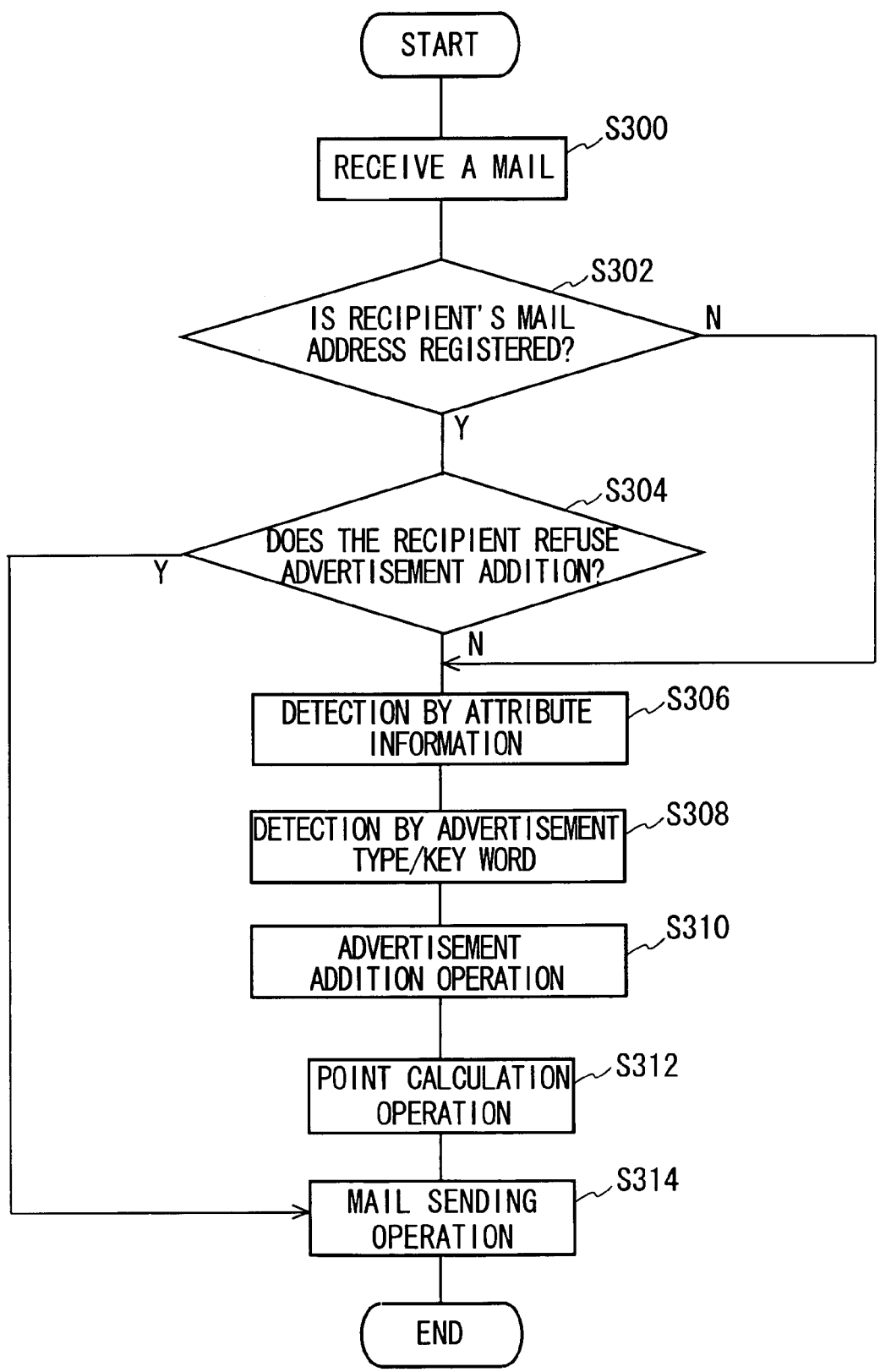
FIG. 6 is a flowchart of an advertisement information addition operation in an SMTP server, according to the first embodiment of the present invention.

FIG. 6 is a flowchart of an operation for adding the advertisement information in the SMTP server according to the first embodiment of the present invention. It is assumed that the mail has already been sent to the SMTP server 60 from the terminal 10. In the SMTP server 60, the mail receiving portion 62 receives the mail sent from the terminal 10 (Step S300), the advertisement information detector 66 detects whether or not the mail address of the recipient of the mail received by the mail receiving portion 62 is registered in the user information (Step S302). In the case where the recipient's mail address is registered, the addition controller 70 detects whether or not the addition refusal information is set in the advertisement permission/refusal field associated with the recipient's mail address of the mail received by the mail receiving portion 62, in the memory 80 (Step S304).

In the case where the addition refusal information is set, this means that the user having said mail address refuses the addition of the advertisement. Therefore, the addition controller 70 stops the addition of the advertisement information to the mail by the advertisement adding portion 68. Thus, the advertisement adding portion 68 sends the mail received by the mail receiving portion 62 as it is, via the mail sending portion 64 (Step S314).

On the other hand, in the case where the mail address of the recipient is not registered or the case where the mail address of the recipient is registered but the addition refusal information is not set, the advertisement information detector 66 detects the attribute information associated with the mail address of the sender or the recipient of the mail received by the mail receiving portion 62, from the user information in the memory 80. Also, the advertisement information detector 66 detects the advertisement information for which the detected attribute information is set as an advertisement target, from the advertiser information in the memory 80 (Step S306).

Then, the advertisement information detector 66 detects the type of transmissible advertisement/key word associated with the mail address of the sender of the mail received by the mail receiving portion 62 or the type of receivable advertisement/keyword associated with the mail address of the recipient thereof from the user information in the memory 80, and detects the advertisement information including a phrase corresponding to the detected type of transmissible advertisement/key word or the detected type of receivable advertisement/key word from the advertiser information in the memory 80. Also, the advertisement information detector 66 detects the advertisement information for which the addition key word field of the advertiser information stores a keyword corresponding to a phrase included in the sentences of the mail, and the key word corresponding to the phrase included in the sentence of the mail removes the advertising information made associated with the addition key word field, from detecting objects (S308).

Next, the advertisement information adding portion 68 adds the advertisement information detected by the advertisement information detector 66 to the mail received by the mail receiving portion 62. Also, the advertisement information adding portion 68 adds to the mail the user specifying information that specifies the user having the mail address of the recipient of said mail, the advertiser specifying information that specifies the advertiser, and the link information that makes the terminal 10 send the user specifying information and the advertiser specifying information to the web server 50 in the case where the instruction is provided by the terminal's user.

Moreover, the advertisement information adding portion 68 adds to the mail the notice of application for a gift, and the contents notifying the recipient that the recipient can apply for the gift. At the same time, the advertisement information adding portion 68 adds to the mail the user specifying information that specifies the user having the mail address of the recipient of said mail and the application information including the link information enabling said user specifying information to be sent to the web server 50 (Step S310). Then, the advertisement information adding portion 68 updates the points in the point information field of the user information in the memory 80, associated with the sender's mail address of said mail to which the advertisement information is added (Step S312).

Subsequently, the mail sending portion 64 sends the mail to which the advertisement information was added by the advertisement information adding portion 68, to the existing SMTP server 30 that receives and stores the mails to be sent to the mail address of the recipient of said mail (Step S314).

Figure 7:
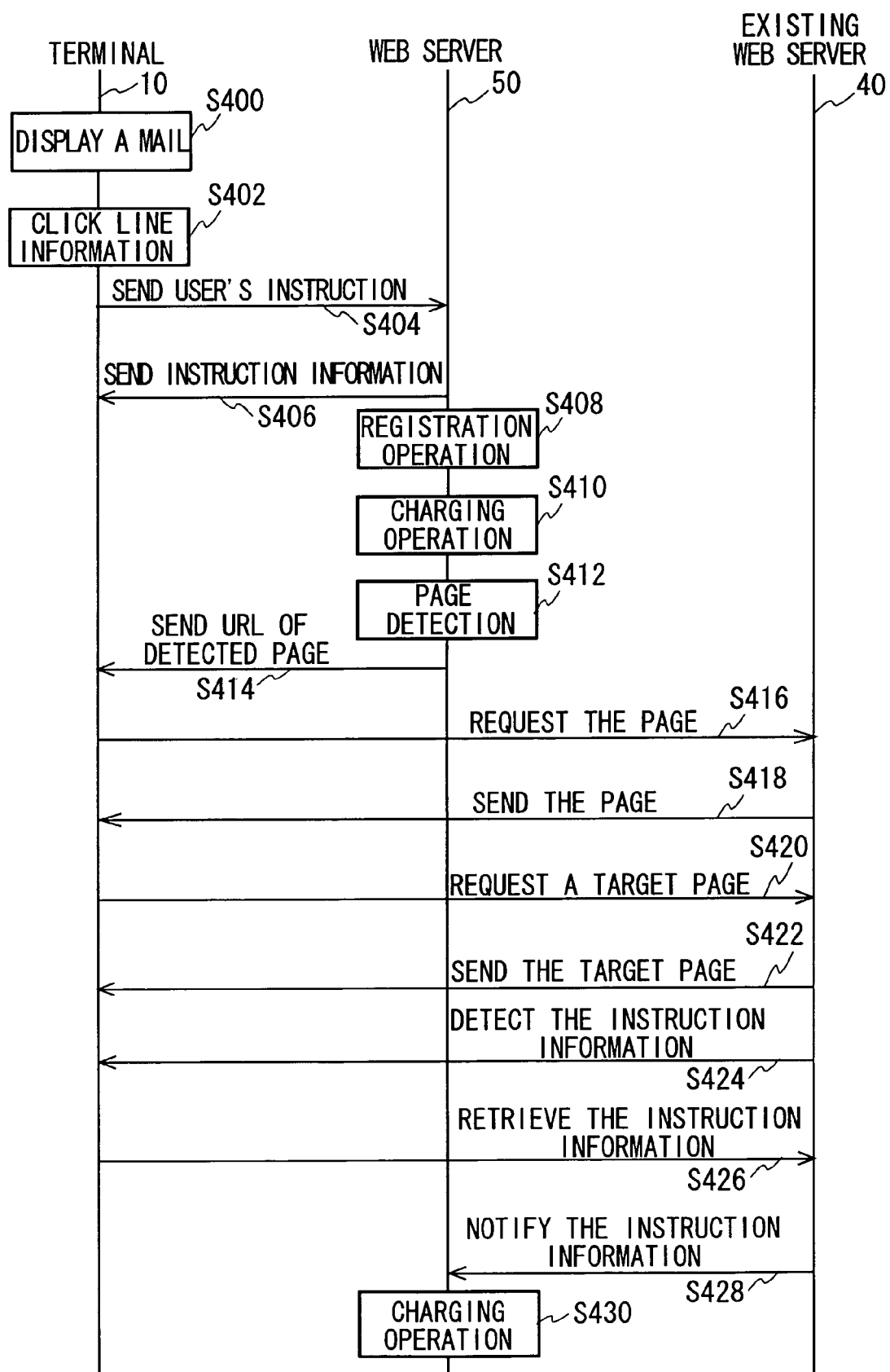
FIG. 7 is a flowchart of a charging operation, according to the first embodiment of the present invention.

FIG. 7 is a flowchart of a charging operation according to the first embodiment of the present invention. Here, it is assumed that the mail to which the advertisement information is added, has been received by the terminal 10 and is stored in the memory 20. Also, it is assumed that a homepage that the advertiser wishes to distribute to the user (a target homepage) is stored in the existing web server 40, and a program, that has a function of detecting whether or not the instruction information is stored in the memory 20 of the terminal 10 that requested said homepage and a function of sending said instruction information to the web server 50 if said instruction information is stored, is made to be associated with the homepage. This program may be executed by the existing web server 40 and the terminal 10, or by the terminal 10. In the present embodiment, the program is executed by the terminal 10 and the existing web server 40.

When the user inputs, via the input portion 16, an instruction to display the mail, the mail processor 12 retrieves the corresponding mail from the memory 20 so as to display it using the display 18 (Step S400). Then, in the case where the user clicks the link information in the advertisement information via the input portion 16 (Step S402), the page processor 14 sends the user specifying information and the advertisement specifying information to the web server 50, based on said link information (Step S404).

In the web server 50, the page processor 56 receives the user specifying information and the advertisement specifying information via the sending/receiving portion 52, and makes the memory 20 of the terminal 10 store the instruction information indicating that the user performed the instruction to refer to the homepage of the detailed advertisement based on the advertisement information included in the mail (Step S406). Then, the page processor 56 registers various types of information corresponding to the date of click field, the type of advertisement field, the advertisement ID field, the number of repetition field, the number of click times field, the inserted position field of the user information based on the user specifying information and the advertisement specifying information (Step S408).

Next, based on the user specifying information, the page processor 56 updates the point information of the corresponding user. Also, based on the advertisement specifying information, the page processor 56 updates the click charging counts of the corresponding advertiser (Step S410). Then, the page processor 56 obtains URL of the homepage of the detailed advertisement from the advertiser information in the memory 80 based on the advertisement specifying information (Step S412), and sends an instruction to obtain the homepage having the obtained URL to the terminal 10 (Step S414).

In this way, the page processor 14 in the terminal 10 sends the homepage of the received URL to the existing web server 40 having said homepage (Step S416). Then, the existing web server 40 sends said homepage to the terminal 10 (Step S418). The page processor 14 receives said homepage sent and displays it by the display 18. Thus, the advertiser can show the user the homepage that the advertiser wishes to show. Accordingly, the user can trace other pages that are linked to said homepage.

When the user inputs a display request of a target homepage via the input portion 16 in the terminal 10, the page processor 14 sends a sending request of said target homepage to the existing web server 14 that stores said target homepage (Step S420). Then, the existing web server 40 sends said homepage to the terminal 10 (Step S422). In this way, the page processor 14 receives said target homepage and displays it by the display 18. The target homepage has a function of making the page processor 14 in the terminal 10 detect whether or not the instruction information is stored in the memory 20, and a function to send the instruction information to the existing web server 40. Such an operation is performed by the page processor 14 (Steps S424, S426).

Next, the existing web server 40 receiving the instruction information sends the received instruction information to the web server 50 due to the function of the target homepage (Step S428). Then, in the web server 50 receiving the instruction information, the page processor 56 updates the goal achievement charging count of the advertiser information associated with the advertiser specifying information that is included in the instruction information (Step S430).

Figure 8:
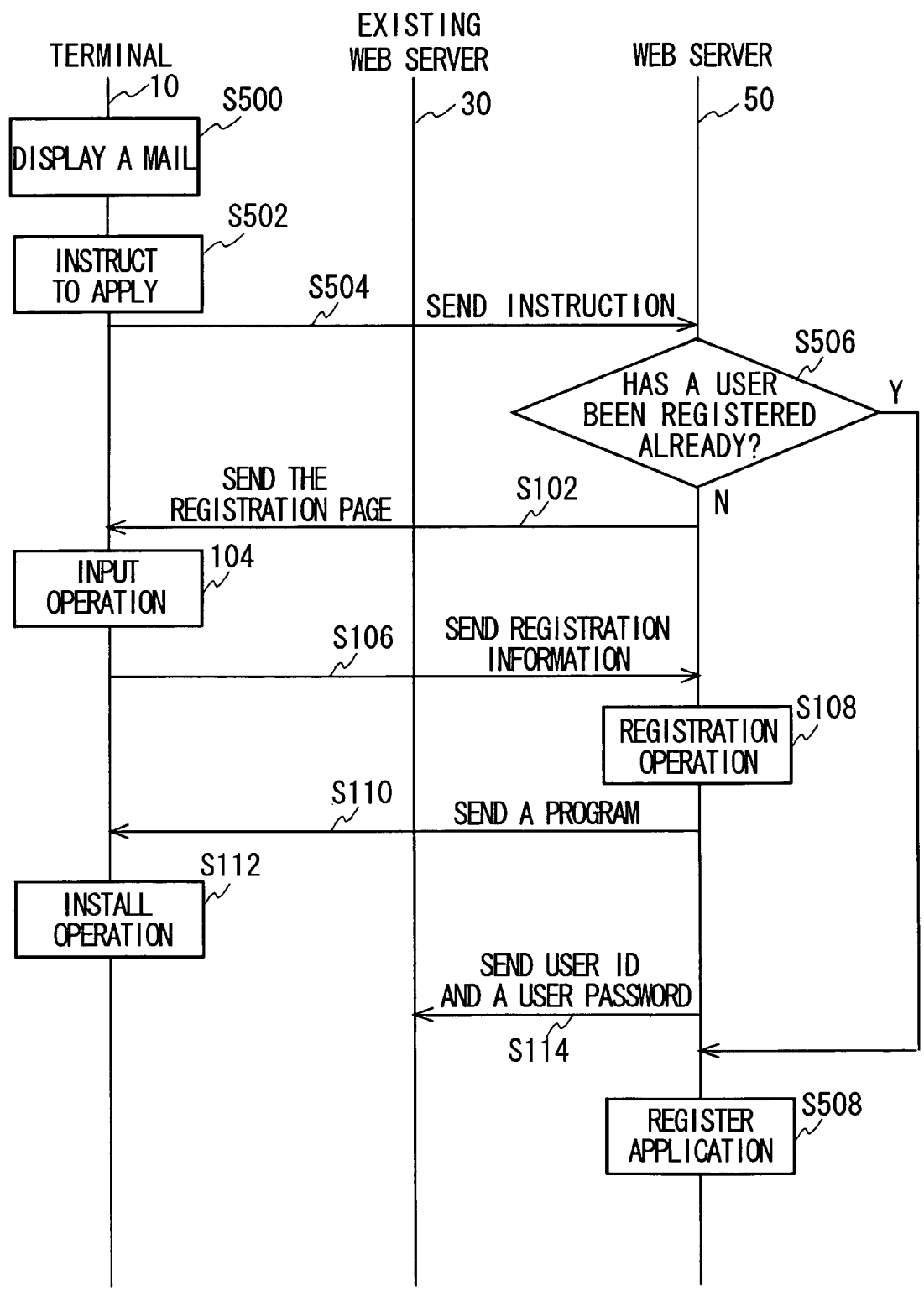
FIG. 8 is a flowchart of an operation related to gift application, according to the first embodiment of the present invention.

FIG. 8 is a flowchart of an operation related to the application for the gift according to the first embodiment of the present invention. Processes similar to those shown in FIG. 4 are labeled with the same reference numerals in FIG. 8 and the description thereof will be omitted. In the following description, it is assumed that the mail to which the advertisement information is added has been received by the terminal 10 and is stored in the memory 20.

When the user inputs the instruction to display the mail via the input portion 16, the mail processor 12 retrieves the corresponding mail from the memory 20 and displays the retrieved one by the display 18 (Step S500). Then, when the user clicks the application-link information of the application information via the input portion 16 (Step S502), the page processor 14 sends the user specifying information to the web server 50 based on said application-link information (Step S504).

In the web server 50, the page processor 56 receives the user specifying information via the sending/receiving portion 52 and detects whether or not the user corresponding to the received user specifying information has already set necessary items as the user information, that is, the registration has been done (Step S506). In the case where the user has not filled in the necessary items, Steps S102 to S114 described before are performed in order for the user to complete the registration. Thereafter, the user can get a service for adding the advertisement information to mails. In this way, the number of the users who can get the service for adding the advertisement information to the mails can be increased. In the case where the user has already registered, or the case where the user has finished registration in accordance with Steps S102 to S114, said user is registered as an applicant for the gift in the memory 80 (Step S508).

According to the mail processing system, the addition of the advertisement information to the mail can be prevented in the case where the user that is specified as the recipient of the mail refuses the addition of the advertisement information. Also, the advertisement information that the user, who is the recipient of the mail, wishes to add can be appropriately added to the mail, and it is possible to prevent the addition of the advertisement information that the user who is the recipient does not wish to add. In addition, the advertisement information that the sender of the mail wishes to add can be added. Also, it is possible to prevent the addition of the advertisement information that the sender of the mail does not wish to add. Moreover, it is possible to appropriately stop the addition of the advertisement information to the mail. Furthermore, it is possible to prevent the addition of the advertisement to the mail including the sentence to which the advertiser does not wish to add the advertisement information.

Figure 9:
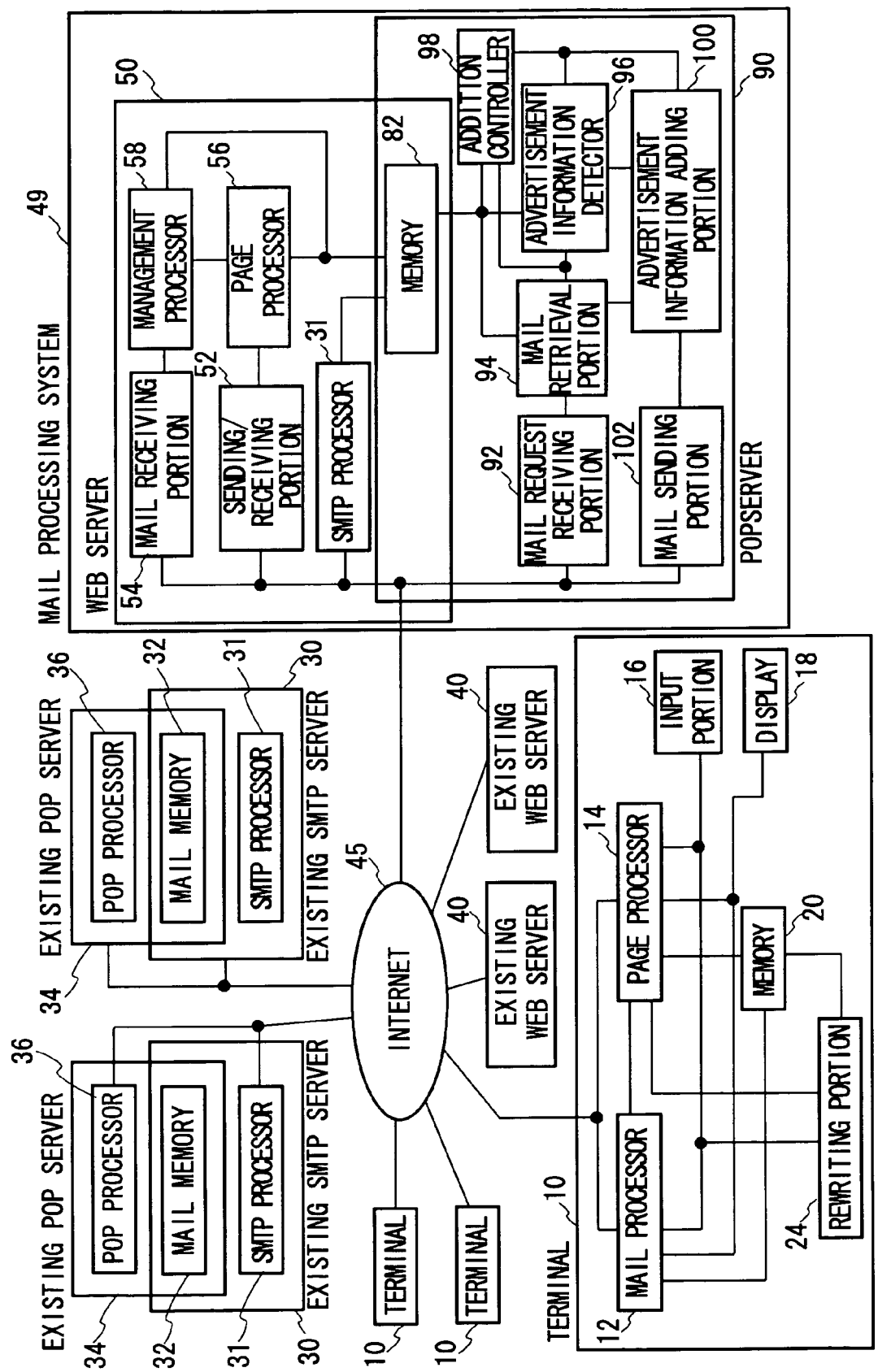
FIG. 9 is a block diagram showing an Internet system including a mail processing system, according to the second embodiment of the present invention.

FIG. 9 is a diagram showing a structure of the Internet system including the mail processing system according to the second embodiment of the present invention. Parts having similar functions to those in the Internet system shown in FIG. 1 are labeled with the same reference numerals in FIG. 9, and the description thereof will be omitted.

The operation for adding the advertisement information is performed in the server that sends the mail to the server that is specified by the server address included in the mail address of the recipient in the mail processing system 50 according to the first embodiment of the present invention. Instead, in the mail processing system 49 according to the present embodiment, the operation for adding the advertisement information is performed in the server that stores the mail having a predetermined mail address as the recipient and, based on the sending request from the terminal for sending the mail having the predetermined mail address as the recipient to said terminal, sends the corresponding mail to said terminal.

The mail processing system 49 according to the present embodiment includes the mail processing system 48 according to the first embodiment and further includes an SMTP processor 31, a memory 82 in place of the memory 80 and a POP server 90 as an example of the mail server in place of the SMTP server 60. The POP server 90 includes a mail request receiving portion 92, a mail retrieving portion 94, an advertisement information detector 96 as an example of an additional information detector, an addition controller 98, an advertisement information adding portion 100 as an example of a point updating portion and an additional information adding portion, a mail sending portion 102 and the memory 82. Here, the mail memory, the advertisement information memory, the user information memory, the addition refusal information memory, the target key word memory, the non-target key word memory, the point information memory, the advertisement information memory, the additional information memory and the charging information memory that are recited in the appended claims are implemented by the memory 82 in the present embodiment.

The memory 82 stores the mail (s) having a predetermined mail address as the recipient, stored in the memory 80. The mail request receiving portion 92 receives a sending request of the mails having the predetermined mail address as the recipient stored in the memory 82 from the terminal 10. The mail retrieving portion 94 retrieves from the memory 82 the mail having the mail address as the recipient, corresponding to the sending request received by the mail request receiving portion 92. The advertisement information detector 96 detects the advertisement information for the mail retrieved by the mail retrieving portion 94, whereas the advertisement information detector 66 detects the advertisement information for the mail received by the mail receiving portion 62 in the first embodiment.

The addition controller 98 controls the addition of the advertisement information to the mail retrieved by the mail retrieving portion 94, whereas the addition controller 70 controls the addition of the advertisement information to the mail received by the mail receiving portion 62. Similarly, the advertisement information adding portion 100 adds the advertisement information to the mail retrieved by the mail retrieving portion 94, whereas the advertisement information adding portion 68 adds the mail received by the mail receiving portion 62. The mail sending portion 102 sends the mail to the terminal which requested to send the mail.

According to the mail processing system of the present embodiment, in the case where the user who is the recipient of the mail refuses the addition of the advertisement information, it is possible to prevent the addition of the advertisement information to the mail to said user. In addition, it is possible to add the advertisement information, that the user who is the recipient wishes to add, to the mail appropriately. Also, it is possible to prevent the addition of the advertisement information that the user who is the recipient does not wish to add. Moreover, the advertisement information that the sender of the mail wishes to add can be added to the mail. Also, the advertisement information that the sender of the mail does not wish to add can be prevented from being added to the mail. Furthermore, it is possible to appropriately stop the addition of the advertisement information to the mail. Also, it is possible to prevent the addition of the advertisement to the mail including the sentence for which the advertiser does not wish to add the advertisement information.

The present invention should not be limited to the above embodiments, but can be modified in various ways. For example, the advertisement information may be detected using at least one condition, although the advertisement information detector 66 or 96 detects the advertisement information using a plurality of conditions in the above embodiment. Also, although the advertisement information is added in the above embodiments, the present invention is not limited thereto. Other information, such as news, may be added instead of the advertisement information.

In the above embodiment, the entire mail address of the recipient is stored as the mail address and various settings are associated with each user's mail address in order to add the advertisement information. Alternatively, a part of the mail address, for example, only the server address in the mail address may be stored while the various settings are associated with said server address. In this case, the advertisement information detector 66 or 96 detects the advertisement information based on a part of the mail address of the recipient. This can allow the addition of desired advertisement information to the mail that belongs to a predetermined group mail or prevent such addition. Also, it is possible to add predetermined advertisement information to the mail that is to be sent to a predetermined server or prevent the addition of the predetermined advertisement information.

In the above embodiments, the addition controller 70 can be modified to detect the mail address of the sender of the mail received by the mail receiving portion 62 and the mail address set in said mail as a reply address and to stop the addition of the advertisement information to the mail when the detected mail address is not coincident with the detected reply address.

In the above embodiments, the addition controller 70 can be modified so as not to add the advertisement information in the case where the mail received by the mail receiving portion 62 has a plurality of recipients the number of which is equal to or larger than a predetermined number. This can suppress the load on the SMTP server 60. In addition, the advertisement information adding portion 68 in the above embodiments can be modified to add, to the mail having the mail address as the recipient for which the necessary items have been already registered in the memory 80, the number of the points of the user having said mail address and send it.

In the above embodiments, when the user clicks the application-link information in the application information and thus the user specifying information is sent, the page processor 56 detects whether or not said user has already registered the user information, and then recommends said user to register the user information by sending the registration page for registration if said user did not register it. However, the present invention is not limited to the above. For example, when the user clicks the advertisement-link information and thus the user specifying information is sent, it may be detected whether or not said user has already registered the user information, and then the registration may be recommended to said user if said user has not registered yet.

The user information stored in the memory 80 and the data structure of the advertiser information are not limited to those described in the above embodiments. They may be formed by a plurality of tables associated with one another, for example. In addition, the advertisement information detector 66 may remove the advertisement information which has been added to the mails to the recipient of the mail received by the mail receiving portion 62, a predetermined number of times or more, from the object of the detection. It should be noted that the number of the addition performed for each recipient can be found by referring to the number of addition field of the user information.

In the above embodiments, the registration page may be formed so as to make the user input a mail address of another user to which said user wishes to introduce the service of addition of the advertisement information to the mail, and the page processor 14 in the terminal 10 may be formed to send the setting information of said user and the mail address of the other user. In this case, the page processor 56 notifies the management processor 58 the mail address of the other user, and then the management processor 58 creates a mail including information on URL of the registration page together with the contents that "XX introduced you to us . . . ", and the mail sending portion 54 sends the created mail to the mail address of the other user. This can increase the users who can get the service of the addition of the advertisement information to the mail, thus improving the effect of the advertisement.

As is apparent from the above description, advertisement information can be added to a mail appropriately, according to the present invention. Also, according to the present invention, the addition of the advertisement information to the mail can be stopped appropriately.

Although the present invention has been described by way of exemplary embodiments, the scope of the present invention cannot be limited to those described in the above embodiments. It should be understood that many changes and substitutions may be made by those skilled in the art without departing from the spirit and the scope of the present invention which is defined only by the appended claims.

What is claimed is:

1. An SMTP server arranged to send an electronic mail having an intended recipient to a server that receives and manages the mail, comprising:
    an advertisement information memory operable to store advertisement information to be added to the mail;
    a user information memory operable to store a plurality of mail addresses and a plurality of pieces of personal information about users for the plurality of mail addresses so as to be associated with each other, respectively;
    an advertisement information detector operable to detect the advertisement information which is to be added to the mail that is associated with at least one of: (a) user information about a user having the recipient mail address, (b) user information about a user having a sender mail address corresponding to a sender of the mail and (c) a portion of a message in the mail, from the advertisement information memory;
    an advertisement information adding portion operable to add at least the advertisement information, which is detected from the memory by said advertisement information detector, to the mail;
    a sending portion operable to send the mail, on which the advertisement information is added by the advertisement information adding portion, to the server;
    an addition refusal information memory, operable to store addition refusal information specifying a mail address of the recipient that refuses the addition of the advertisement according to an intention of the recipient; and
    an addition controller operable to stop the addition of the advertisement information by the advertisement information adding portion to the mail, in a case where the mail address specified by the addition refusal information is the mail address of the recipient of the mail.

2. The SMTP server of claim 1, wherein the advertisement information includes page specifying information that specifies a predetermined homepage.

3. The SMTP server of claim 2, wherein:
    the advertisement information memory stores the advertisement information and personal information about a user who is an object for which addition of said advertisement information is performed so as to be associated with each other, the advertisement information detector detects the personal information associated with the mail address of the recipient of the mail from the user information memory, and detects the advertisement information associated with said detected attributed information from the advertisement memory.

4. The SMTP server of claim 3, wherein the attribute information is at least one of age, gender and a zip code.

5. The SMTP server of claim 4, further comprising a target key word memory, operable to store the advertisement information and a key word to be included in a sentence of a mail to which said advertisement information is added, so as to be associated with each other,
    wherein the advertisement information detector detects advertisement information that is associated with a key word corresponding to a phrase included in a sentence of the mail to be sent.

6. The SMTP server of claim 5, further comprising a non target key word memory operable to the advertisement information and a key word to be included in a sentence of a mail to which said advertisement information is not added so as to be associated with each other,
    wherein the advertisement information detector removes the advertisement information associated with a keyword corresponding to the phrase included in the sentence of the mail to be sent from an object of detection.

7. The SMTP server of claim 6, wherein the mail has a plurality of mail addresses of recipients,
    the sending portion sends the mail to each of the mail addresses of the recipients when the mail has the plurality of mail addresses of the recipients,
    the advertisement information detector detects the advertisement information to be added to the mail that is to be sent to each of the mail addresses, based on the attribute information of the user corresponding to each of the mail addresses, and
    the advertisement information adding portion adds the advertisement information to the mail that is sent to each of the mail addresses of the recipients.

8. The SMTP server of claim 7, further comprising:
    a point information memory operable to store a mail address and point information for a user having said mail address to be associated with each other; and
    a point updating portion operable to update the point information associated with the mail address of the sender of the mail, when the advertisement information adding portion adds the mail to the advertisement information.

9. A POP server for storing a mail having a predetermined mail address as a recipient and for sending a mail having the predetermined mail address as the recipient to a terminal, based on a sending request from the terminal to send the mail having the predetermined mail address to the terminal, the POP server comprising:
    a mail memory operable to store the mail having the predetermined mail address as the recipient;
    an advertisement information memory operable to store at least one piece of advertisement information;
    an advertisement information detector operable to retrieve at least one piece of advertisement information that is to be added to the mail from the advertisement information memory, based on at least one of user information about a user having a mail address of a sender of the mail, user information about a user having the mail address of the recipient of the mail, and a sentence of the mail;
    an advertisement information adding portion operable to add the advertisement information detected to the mail;
    a sending portion operable to send the terminal the mail to which the advertisement information is added;
    an addition refusal information memory, operable to store addition refusal information specifying a mail address of the recipient that refuses the addition of the advertisement according to an intention of the recipient; and
    an addition controller operable to stop the addition of the advertisement information by the advertisement information adding portion to the mail, in a case where the mail address specified by the addition refusal information is the mail address of the recipient of the mail.

10. The POP server of claim 9, wherein the advertisement information includes page information that specifies a predetermined homepage.

11. The POP server of claim 9, wherein:
    the advertisement information memory stores the advertisement information and the personal information of a user for which the addition of the advertisement information is performed so as to be associated with each other,
    the advertisement information detector detects the personal information associated with the mail address of the mail from the memory and detects the advertisement information associated with the detected personal information.

12. The POP server of claim 9, wherein the attribute information indicates at least one of age, gender and a zip code.

13. The POP server of claim 9, further comprising a target key word memory operable to store the advertisement information and a key word to be included in a sentence of a mail to which said advertisement information is added so as to be associated with each other,
    wherein the advertisement information detector detects advertisement information associated with the key word corresponding to a phrase included in a sentence of the mail.

14. The POP server of claim 9, further comprising a non target key word memory operable to store the advertisement information and a key word that is to be included in a sentence of a mail to which said advertisement information is not added,
    wherein the advertisement information detector removes the advertisement information associated with the key word corresponding to the phrase included in the sentence of the mail from an object of detection.

15. The POP server of claim 9, further comprising:
    a point information memory operable to store a mail address and point information for a user having said mail address so as to be associated with each other; and
    a point updating portion operable to update the point information associated with the mail address of the recipient of the mail, when the advertisement information adding portion adds the advertisement information to the mail.

16. A mail server for sending a mail sent from a first information process apparatus to a second information process apparatus, comprising:
    an additional information memory operable to store additional information to be added to the mail;
    an additional information detector operable to detect the additional information from the additional information memory based on at least one of attribute information about a user having a mail address of a sender of the mail, attribute information about a user having a mail address of a recipient of the mail, and a sentence of the mail;
    an additional information adding portion operable to add the additional information to the mail sent from the first information process apparatus; and
    a sending portion operable to send the mail to which the additional information is added to the second information process apparatus;
    an addition refusal information memory, operable to store addition refusal information specifying a mail address of the user that refuses the addition of the advertisement according to an intention of the user; and
    an addition controller operable to stop the addition of the advertisement information by the advertisement information adding portion to the mail, in a case where the mail address specified by the addition refusal information is the mail address of the recipient of the mail.

17. A mail processing system comprising a web server operable to send a predetermined program to a terminal based on a request from the terminal; and a mail server operable to send a mail having a recipient mail address of an intended recipient to a server that receives and stores the mail, wherein the mail server includes:
  an advertisement information memory operable to store advertisement information to be added to the mail;
  a user information memory operable to store a plurality of mail addresses and a plurality of pieces of personal information about users for the plurality of mail addresses so as to be associated with each other, respectively;
  an advertisement information detector operable to detect advertisement information, which is to be added to the mail that is associated with at least one of: (a) user information about a user having the recipient mail address, (b) user information about a user having a sender mail address corresponding to a sender of the mail, and (c) a portion of a message in the mail from the advertisement information memory;
  an advertisement information adding portion operable to add the advertisement information, which is detected from the advertisement information memory by said advertisement information detector, to the mail;
  a sending portion operable to send the mail, to which the advertisement information is added by said advertisement information adding portion, to the server, wherein the web server includes:
    a reception portion operable to receive an adding request of advertisement information to the mail from the terminal; and
    a setting controller operable to send a program to the terminal, from which the adding request is received, so that the mail, which is to be sent to the recipient mail address from the terminal, is sent to the mail server that adds the advertisement information to the mail;
  an addition refusal information memory, operable to store addition refusal information specifying a mail address of the recipient that refuses the addition of the advertisement according to an intention of the recipient; and
  an addition controller operable to stop the addition of the advertisement information by the advertisement information adding portion to the mail, in a case where the mail address specified by the addition refusal information is the mail address of the recipient of the mail.

18. The mail processing system of claim 17, wherein the advertisement information adding portion of the mail server adds to the mail, advertisement information including user specifying information that specifies a user of the mail, address of the recipient of the mail, and link information that makes the terminal used by the user send the user specifying information to the web server when an instruction by the user occurs,
  the web server or the mail server includes a point information memory operable to a mail address, and point information of a user having said mail address to be associated with each other, the web server further includes:
  a user specifying information receiving portion operable to receive the user specifying information sent from the terminal by the link information; and
  a point updating portion operable to update, based on the user specifying information received by the user specifying information receiving portion, the point information of the corresponding user.

19. The mail processing system of claim 17, wherein the advertisement information adding portion in the mail server adds to the mail advertisement, specifying information that specifies an advertiser of the advertisement information, and link information that makes a terminal used by the user having the mail address of the recipient of the mail send the advertisement specifying information to the web server when an instruction of said user occurs,
  the web server or the mail server includes a charging information memory operable to store information specifying an advertiser and charging information about charging on said advertiser, the web server further includes:
  an advertisement specifying information receiving portion operable to receive the advertisement specifying information sent from the terminal by the link information; and
  a charging information updating portion operable to update, based on the advertisement specifying information received by the advertisement specifying information receiving portion, the charging information of a corresponding advertiser.

20. The mail processing system of claim 17, wherein the web server or the mail server includes a charging information memory operable to store advertisement specifying information that specifies an advertiser, charging information about charging on said advertiser, and address information of an advertisement homepage to be presented to a user of a terminal, so as to be associated with one another,
  the advertisement information adding portion adds to the mail advertisement, specifying information that specifies an advertiser of the advertisement information, and link information that makes the terminal send the advertisement specifying information to the web server in a case where an instruction of the user of the terminal occurs, the web server includes:
  an advertisement specifying information receiving portion operable to receive the advertisement specifying information sent from the terminal by the link information; an instruction information memory controller operable to control the terminal that sent the advertisement specifying information, to store instruction information indicating that an instruction by the user occurred; and a homepage retrieval controller operable to detect, based on the advertisement specifying information received by the advertisement specifying information receiving portion, the address information of the advertisement homepage associated with the advertisement specifying information and to control the terminal to retrieve the advertisement homepage having said address information.

21. The mail processing system of claim 20, further comprising:
  a confirmation receiving portion operable to receive confirmation that the instruction information is stored in a terminal that requested a predetermined target homepage that is linked to the advertisement homepage; and
  a goal achievement charging updating portion operable to update, based on receipt of the confirmation, the charging information associated with an advertisement specifying information of an advertiser of the target homepage indicated by the confirmation.

22. A method for enabling a terminal to send a mail, comprising:
  receiving a request to add advertisement information to a mail from the terminal by a web server;

sending a predetermined program to the terminal from which the adding request came;

installing the program in the terminal for enabling the terminal to send a recipient addressed mail to a mail server that adds the advertisement information, which is associated with at least one of: (a) user information about a user having the recipient mail address, (b) user information about a user having a sender mail address corresponding to a sender of the mail, and (c) a portion of a message in the mail, to the mail storing addition refusal information specifying a mail address of the user that refuses the addition of the advertisement according to an intention of the user; and stopping the addition of the advertisement information by the advertisement information adding portion to the mail, in a case where the mail address specified by the addition refusal information is the mail address of the recipient of the mail.

* * * * *